J. I. AULT.
TRAP NEST.
APPLICATION FILED MAR. 14, 1908.
935,084.
Patented Sept. 28, 1909.
3 SHEETS—SHEET 1.
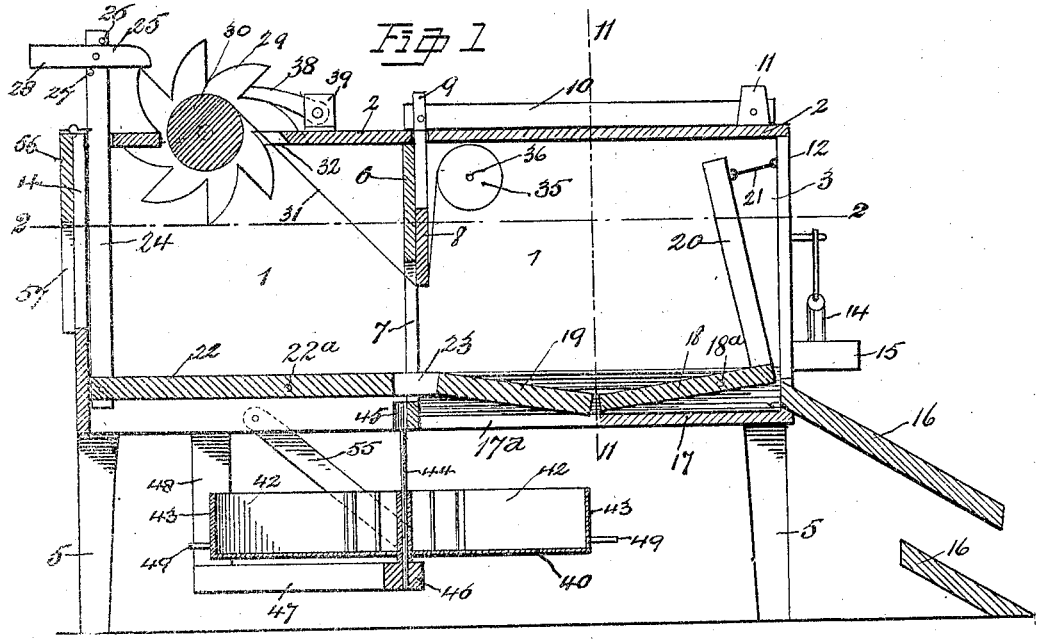
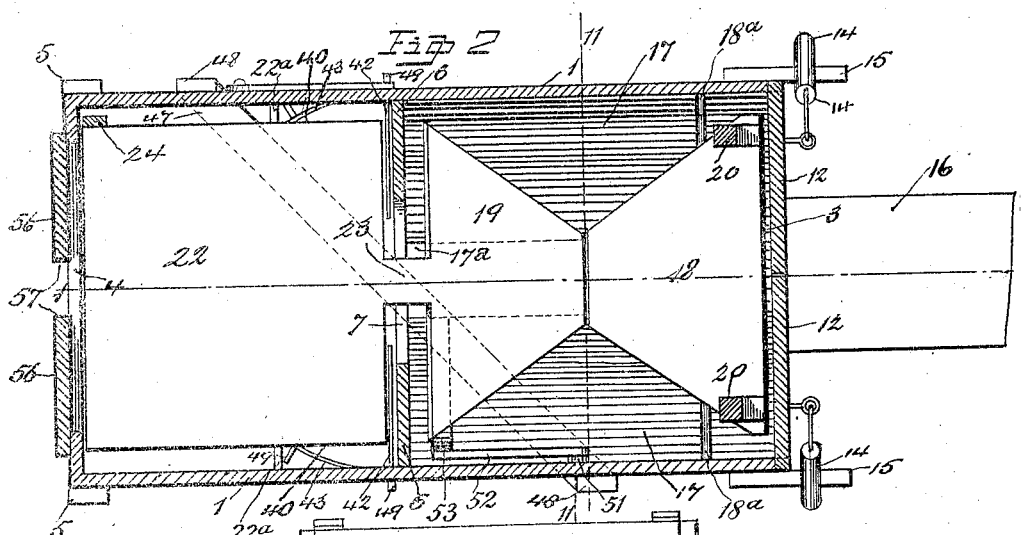
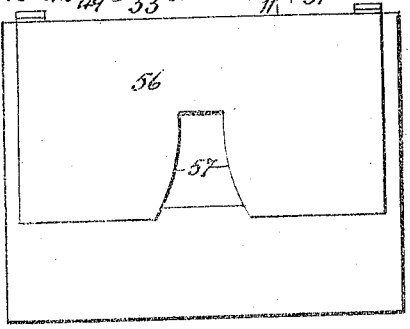
WITNESSES:
INVENTOR
Joseph I. Ault
BY
Thompson & Bell
ATTORNEY

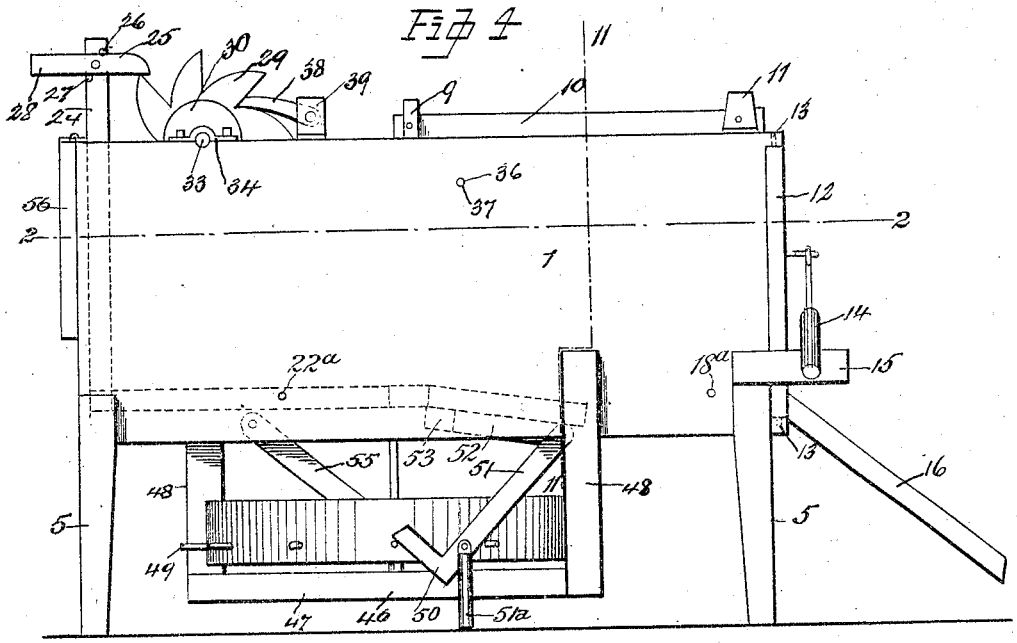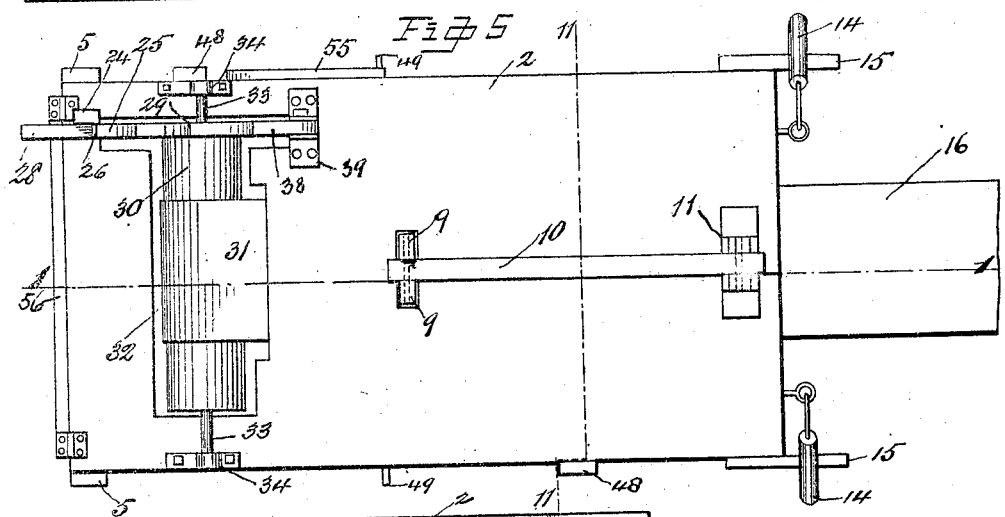

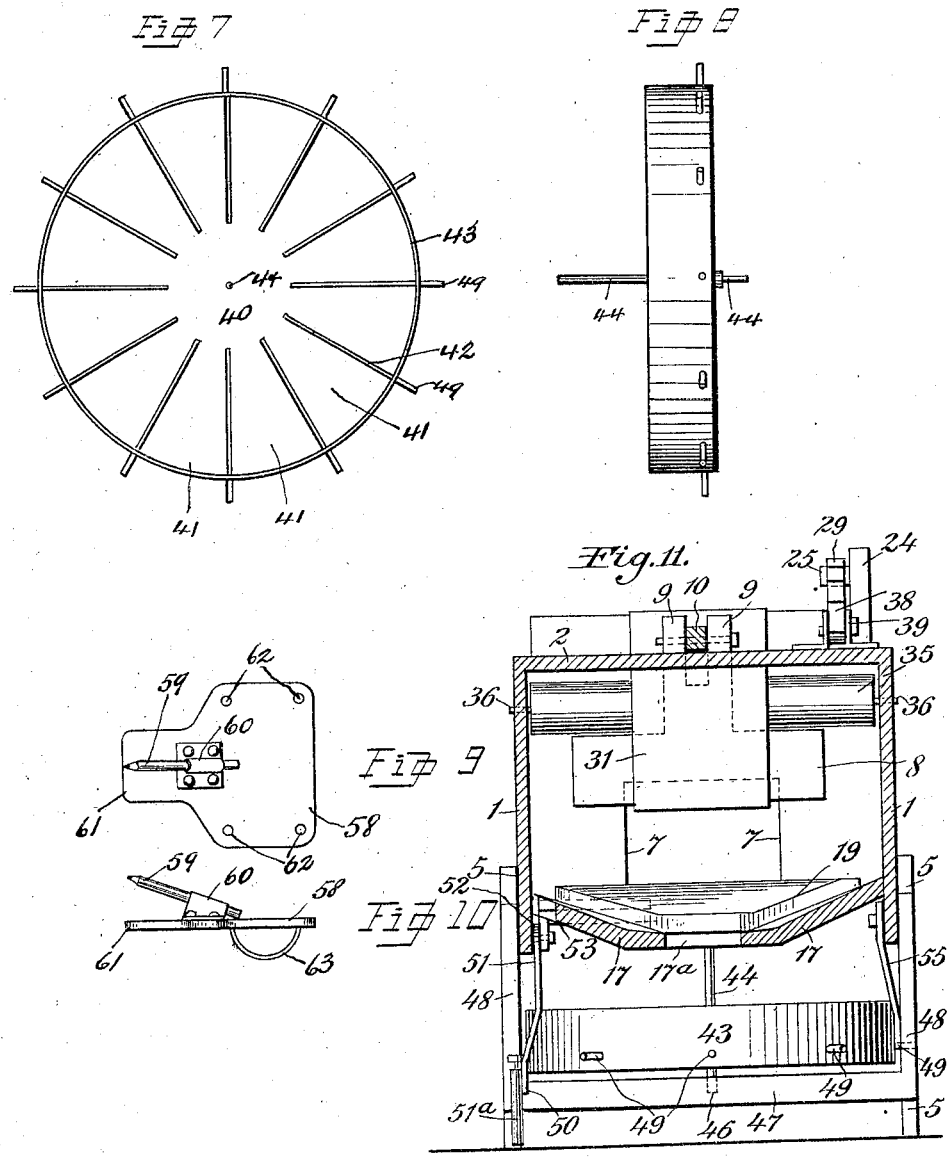

UNITED STATES PATENT OFFICE.

JOSEPH I. AULT, OF COLUMBUS, INDIANA

TRAP-NEST.

935,084.

Specification of Letters Patent. Patented Sept. 28, 1909.

Application filed March 14, 1908. Serial No. 421,098.

*To all whom it may concern:*

Be it known that I, JOSEPH I. AULT, citizen of the United States, residing at Columbus, in the county of Bartholomew and State of Indiana, have invented certain new and useful Improvements in Trap-Nests, of which the following is a specification, reference being had therein to the accompanying drawing.
My invention relates to improvements in trap nests for hens, as hereinafter described in the specification and particularly pointed out in the claims.

The object of this invention is to construct a trap nest for hens or other domestic fowls, whereby the eggs laid by the hen or other fowl occupying the trap-nest are recorded as they are laid. I attain this object by means of the trap-nest illustrated in the accompanying drawings in which like numerals of reference designate like parts throughout the several views.

Figure 1 is a longitudinal vertical sectional view showing the interior arrangement of the trap-nest, and taken along the line 1—1 in Figs. 2 and 5; Fig. 2 is a sectional top view of the same taken along the lines 2—2 in Figs. 1 and 4; Fig. 3 is a rear end elevational view showing the exit door;
Fig. 4 is a side elevational view of the trap nest; Fig. 5 is a top view of the same; Fig. 6 is a front and elevational view showing the entrance doors of the trap-nest; Fig. 7 is a top view of the egg receiving table; Fig. 8 is a side view of the same; Fig. 9 is a detail view of the pencil holding plate; Fig. 10 is a side view of the same, and Fig. 11 is a transverse section of the box showing the inclined floor thereof, and taken along the line 11—11 in Figs. 1, 2, 4 and 5.

The inclosing box of the trap-nest consists of the side walls 1, the top cover 2, the open entrance and exit ends 3 and 4, and the supporting feet 5, whereby the box is supported and held at a distance from the ground. Intermediate the open entrance and exit ends of the box is situated the transversely extending partition 6, which is provided with the open passage way 7, which latter is sufficiently large to permit a hen or other domestic fowl to pass therethrough from the first compartment of the box to the rear compartment thereof. A sliding board 8 is situated in the interior of said box to extend transversely thereof in front of and against the intermediate partition 6, and said sliding board is provided with the top projecting portion 9 which extends through an opening formed in the top cover 2 to be pivotally connected to the rear end of the bar 10. The bar 10 extends forwardly to the standard 11, situated at the forward end of the top cover 2, to which the forward end of said bar is pivotally connected.

The entrance doors 12 are hinged to the box by the hinge pins 13 to open outwardly, and connected to the doors 12 are the counterbalance weights 14 which are suspended from said doors to extend over the tops and outer sides of the arms 15, so that said counterbalance weights will tend to open and maintain the doors 12 open.

The stepping board 16 extends from the front portion of the inclined floor 17 with an easy angle of inclination to the ground, and the same is provided for the purpose of forming a gangway for the hen or other fowl to enter the trap by way of the hopper portions 18 and 19 situated over the inclined floor.

The forward portion 18 of the hopper is situated over the front portion of the inclined floor 17 at the open entrance end of the box. The said hopper portion is pivoted to the side walls 1 of said box by the pivotal axle 18ª, so that its longer inner end will swing downwardly when the hen steps thereon to almost touch the forward edge of the rear portion 19 of the hopper. The side standards 20 extend vertically from the front side portions of the forward portion 18 of the hopper, and links 21 connect the top ends of said standards to the entrance doors 12, so that when the inner end of the forward portion 18 of the hopper is swung downwardly, as by a hen stepping thereon, the top ends of the said standards 20 will swing inwardly to close the doors 12, and to prevent a hen entering the trap when occupied and during its occupation by any other hen. The rear hopper portion is composed of the rear inclined nest portion 19 and the horizontal portion 22, which are connected by the neck portion 23 to form one integral piece, and said horizontal portion is pivoted at its sides to the side walls 1 of the box by the pivotal pins 22ª so that the front end of the nest portion 19 will rise sufficiently above the rear end of the hopper portion 18 to provide an opening sufficiently large to permit an egg to pass therethrough to and through the opening 17ª in the inclined floor 17, and at the same time, to cause the necessary fall of the rear portion 22 of the rear hopper portion to impart the proper amount of travel to the pawl carrying bar 24. The pawl carrying bar 24 is situated at and pivotally connected to the end of one side of the rear portion 22 of the rear hopper portion, and extends vertically sufficiently far to project through an opening formed in the top cover of the box, and at or near the top end of the bar 24 is pivotally connected thereto the pawl 25 which latter is limited in its motion by the stop pins 26 and 27. The pawl 25 is provided with a longer arm 28 which operates as a counterbalance to hold the pawl 25 against the stop pin 26 to engage one of the ratchet teeth of the ratchet 29, which latter is secured on the end of the roller 30. The roller 30 upon which the record paper 31 is wound as it is used, is situated at the rear top end of the box and extends transversely thereof and projects into the opening 32 formed in the top portion 2 of the box, and said roller is provided with the end journals 33 which bear in the bearings 34 formed in the top edges of the side walls 1. The roller 35 is situated in front of the sliding board 8 near the inner top portion 2 and extends transversely of the box, and said roller 35 is mounted on the rod 36 to revolve thereon. The rod 36 extends through bores 37 formed in the side walls 1 whereby it is supported. The record paper 31 is wound upon the roller 35 and extends along the face of the sliding board 8 and under the lower edge of the latter to and around the roller 30 to be wound thereon. A stop pawl 38 is pivoted to the pawl carrier 39 secured to the top cover portion 2 of the box, and said pawl is adapted to engage the teeth of the ratchet wheel 29 to prevent a backward rotation of the latter and the roller 30 whereon said ratchet is secured.

The revoluble table 40 is divided on its top surface into egg receiving compartments 41 by the partitions 42, which latter are closed at their outer ends by the rim 43, and said table is secured on the vertical shaft 44. The shaft 44 is journaled at its top end in the bearing 45 secured to the rear bottom side of the partition 6 and at its bottom end in the foot bearing 46 formed in the hanger 47, the arms 48 of which extend upwardly to be secured to the outer bottom sides of the walls 1 of the inclosing box. Arranged around the peripheral rim 43 at equal intervals apart, equal to the width of the outer portions of the compartments 41, are the pins 49 which are adapted to be engaged by the pawl 50. The pawl 50 is rigidly secured to the free end of the pawl carrying bar 51 which bar is suspended at its upper end from the projecting end portion of the arm 52 which latter extends forwardly from the projecting end portion of the bar 53 which is secured to the under side of the hopper portion 19, and the pivotal point of said bar is so situated on said arm as to impart the proper throw to the pawl 50 to revolve the table 40 a space equal to the outer width of a compartment 41 for each stroke of said pawl bar. A weight 51$^a$ is suspended from the lower end of the bar 50 and the same is provided for the purpose of holding the pawl 50 in contact with a pin 49 while pushing. A stop pawl 55 is situated at the opposite side of the table 40, and is pivotally connected to the outer side of the wall 1 from which point it is suspended so that its free end will engage the pins 49 to prevent the table 40 revolving in a direction opposite to that in which it is driven by the pawl 50.

The exit opening of the box is closed by the door 56, which latter is hingedly connected to the top cover 2 of the box to swing outwardly to open. An opening 57 is formed in said door 56, and the same is provided for the purpose of admitting light to the interior of the box at the exit end thereof, so that a hen, sitting in the nest, will be attracted by the light and walk toward said light opening and open the exit door 56 to go out.

A pencil carrying board 58, is provided with the pencil 59, which pencil is removably secured in the pencil holder 60 to be at an angle with the board, and said pencil is situated with its point directed toward the front end 61 of said pencil board, so that, when a pencil carrying board is secured to the back of each of the hens, the point of the pencil carried by each hen will contact with the record paper situated in front of the sliding board 8 and mark thereon as the hen walks from the nest toward the exit door, so that a separate and distinct mark will be made by each hen indicating that a hen has used the nest and passed through the trap. In said pencil carrying board are the holes 62 through which are passed the securing cords 63 which latter are looped under the wings of a hen to secure said pencil board to its back.

The operation of the apparatus is as follows:—Suppose the nest unoccupied by a hen, under which circumstances the entrance doors 12 are open to admit a hen desiring to lay. The hen desirous of laying first steps on the stepping board 16 and walks thereon to and through the entrance 3 to and upon the nest hopper portion 18 which, on receiving the weight of the hen, swings downwardly at its rear end on its pivot to close the doors 12 against an intruding hen, and thereby shut said hen in the box and exclude the light from entering therein. The hen will now sit on the nest composed of the hopper portions 18 and 19, and thereupon lay her egg, after which she will step on the rear inclined hopper portion 19 and walk toward the light admitted through the opening 57 of the rear door 56, but, in so doing, the point of the pencil 59 on the pencil carrying board 58 will contact the record paper 31 to mark the same as the hen, in her efforts to walk under the bottom edge of the sliding board 8 moves the latter upwardly to release herself to pass through the opening 7 formed in the partition 6, and in so doing will make a pencil mark on the record paper 31. The hen having released herself from under the sliding board 8 will walk on the rear portion 22 of the hopper portion 19 toward the exit door 56, being attracted by the light admitted through the opening 57, and in so doing will tip the rear portion 22 of the rear hopper portion downwardly to move the pawl carrying bar 24 downwardly to cause the pawl 25, pivoted to the top end of said bar, to rotate the ratchet wheel 29, through the space of one pitch of the ratchet teeth, and thereby revolve the roller 30 to wind a portion of the record paper 31 upon itself to move an unmarked portion of said record paper in front of the sliding board 8 for the hen next occupying the nest to mark upon, at the same time, swinging the forward end portion of the hopper portion 19 upwardly sufficiently far to provide a space between the ends of the hoppers 18 and 19 through which the egg laid by the outgoing hen will pass and drop through the opening 17ª formed in the inclined floor 17 to and into an egg receiving compartment 41 of the revoluble table 40. As soon as the hen steps off the hopper portion 18 to and upon the inclined weightier portion of the hopper portion 19, the said hopper portion 18 being thus relieved of its weight will rise or swing upwardly on its pivotal points and the doors 12 connected to the top ends of the standards 20 will be released and will open by the gravity of their counterbalance weights 14. When the outgoing hen pushes the exit door 56 open and flies out of the box releasing the rear end of the hopper portion 22 of her weight, the forward end of the hopper portion 19 will descend by its gravity to cause the pawl 50 to revolve the table 40 to move an empty egg receiving compartment 41 under the opening 17ª to receive the egg laid by a hen next occupying the nest.

I claim:—

1. In a trap nest, the combination with an inclosed box, a partition extending vertically and transversely of said box to divide it into forward and rear compartments, said inclosed box having open forward entrance and rear exit ends, a forward inclined hopper portion a rear hopper portion having a forward inclined portion and a rear horizontal portion, pivots whereby said rear horizontal portion is pivoted to the side walls of said box to swing vertically, of a sliding board situated in front of said partition, a roller situated to extend transversely of and in front of said sliding board, and a roller situated to extend transversely of said box near the rear top portion thereof, a record paper extending from said forward internal roller under said sliding board to and around said rear internal roller, a ratchet on said roller, a pawl, and means connecting said pawl and the rear horizontal portion of said hopper portion whereby the roller is revolved when the weight of the hen is applied to the rear horizontal portion of said hopper portion.

2. In a trap nest, the combination with an inclosed box, a partition extending vertically and transversely of said box to divide it into forward and rear compartments, said inclosed box having entrance and exit ends, a bar situated to extend centrally from the forward top portion of said box, a block to which the said bar is pivoted at its forward end, a sliding board situated in front of and against the top interior portion of said partition, a top projecting portion projecting through the top of said box and pivoted to the rear end of said bar, of a forward inclined hopper portion a rear hopper portion having a forward inclined portion and a rear horizontal portion, pivots whereby said rear horizontal portion is pivoted to the side walls of said box to swing vertically, a roller situated exteriorly of said box to extend transversely thereof, said roller situated near the rear end portion of said box, a forward roller situated within said box to extend transversely and in front of said sliding board, a recording paper extending from the forward internal roller under said sliding board to and around said exterior roller, a ratchet on said exterior roller, a pawl, a rod connecting said pawl and rear horizontal portion of said rear hopper portion whereby the roller is revolved when the weight of the hen is applied to said rear horizontal portion of the rear hopper portion.

3. In a trap nest, the combination with an inclosing box having open entrance and exit ends, closing doors at said entrance end and an outwardly swinging door at said exit end, of a forward hopper portion inclosed in the forward interior bottom portion of said box, means connecting said hopper portion and said entrance doors whereby the latter are closed as the rear end of said hopper portion is depressed, an inclined floor situated under said hopper portion having a central opening therein, a hopper portion situated to the rear of said forward hopper portion and pivotally connected to the side walls of said box, a revoluble egg receiving table, partitions extending radially inwardly from said rim to divide the upper surface of said table into egg receiving compartments, and an arm secured at its rear end to the rear under side of said rear inclined hopper portion and extending forwardly near the side of said hopper portion, a pawl carrying bar suspended from the end of the rear free end of said arm, and a pawl secured to the lower end of said carrying bar whereby when the rear inclined hopper portion is depressed said pawl is operated to revolve said table.

4. In a trap nest, the combination with an inclosed box having open entrance and exit ends, said box divided into a forward nest compartment and a rear exit compartment, and a swinging exit door at the exit end of said compartment. of a forward inclined hopper portion a rear inclined hopper portion situated in the rear of said nest compartment, an inclined floor under said inclined hopper portion having central openings through which the eggs are discharged, a horizontal hopper portion integral with said rear inclined portion situated to the rear of said rear inclined hopper portion, pivots whereby said rear horizontal hopper portion is pivotally connected to the side walls of said box, an egg receiving table situated under said opening in said inclined floor, a peripheral rim on said table, partitions extending radially and inwardly from said rim and dividing the top surface of said table into egg receiving compartments, pins projecting from the outer peripheral surface of said rim, an arm secured at its rear end to the rear under side of said rear inclined hopper portion and extending forwardly near the side of said hopper portion, a pawl carrying bar suspended from the free forward end of said arm, a pawl on the bottom end portion of said bar, and a weight at or near the lower end of said bar whereby said pawl is held in contact with one of said revolving pins, so that, when the horizontal portion situated to the rear of the inclined hopper portion is first depressed and afterward released said pawl will operate said table through a space equal to the peripheral width of an egg compartment thereof.

In testimony whereof I affix my signature in presence of two witnesses.

JOSEPH I. AULT.

Witnesses:
JOHN STOBO,
M. F. G. BUTLER.